United States Patent [19]

Jane et al.

[11] Patent Number: 5,059,642

[45] Date of Patent: Oct. 22, 1991

[54] DEGRADABLE PLASTICS FROM OCTENYL SUCCINATE STARCH

[75] Inventors: Jay-Lin Jane; Robert J. Gelina; Zivko Nikolov; Roque L. Evangelista, all of Ames, Iowa

[73] Assignee: Iowa State University Research Foundation, Inc., Ames, Iowa

[21] Appl. No.: 407,294

[22] Filed: Sep. 14, 1989

[51] Int. Cl.$^5$ .................... C08L 89/00; C08L 3/00
[52] U.S. Cl. .................................. 524/52; 524/47
[58] Field of Search .................................. 524/47, 52

[56] References Cited

U.S. PATENT DOCUMENTS

| | | | |
|---|---|---|---|
| 2,613,206 | 10/1952 | Caldwell | 536/110 |
| 3,907,726 | 9/1975 | Tomiyama | 524/47 |
| 4,016,117 | 4/1977 | Griffin | 524/47 |
| 4,021,388 | 5/1977 | Griffin | 523/123 |
| 4,101,720 | 7/1978 | Taylor et al. | 526/3 |
| 4,125,495 | 11/1978 | Griffin | 524/47 |
| 4,133,784 | 1/1979 | Otey et al. | 524/47 |
| 4,337,181 | 1/1982 | Otey et al. | 523/128 |
| 4,709,808 | 12/1987 | Balduff et al. | 525/185 |

FOREIGN PATENT DOCUMENTS 2029836 3/1980 United Kingdom .

OTHER PUBLICATIONS

Otey, et al., "Starch Graft Copolymers—Degradable Fillers for Poly(vinyl chloride) Plastics," pp. 139–142, Ind. Eng. Chem., Prod. Res. Dev. vol. 15, No. 2, 1976.

Primary Examiner—Nathan M. Nutter
Attorney, Agent, or Firm—Zarley, McKee, Thomte, Voorhees & Sease

[57] ABSTRACT

A plastic and method of producing the same is disclosed where octenyl succinate starch metal ion complexes is combined with a plastic having hydrophobic tendencies. Preferred conditions of mixing are 165° C. to 185° C. temperature, with mixing occurring at 40 rpm to 60 rpm for 30 to 50 minutes.

20 Claims, No Drawings

DEGRADABLE PLASTICS FROM OCTENYL SUCCINATE STARCH

BACKGROUND OF THE INVENTION

This invention relates to plastic compositions which have improved biodegradability while retaining sufficient tensile strength to be useful in a number of applications.

Plastic has been used in a variety of applications and is employed in products as diverse as garbage bags, cups, and packaging. However, plastics also have the problem of not being easily disposed of without causing serious solid pollution problems. The plastics are not always uniform in composition and physical properties not always consistant. Therefore, attention has focused on creating a plastic product which is degradable, in that it can be broken down by enzymes and living microorganisms.

This invention employs the use of starch in developing the plastic, which is itself biodegradable. Specifically, the type of starch which has been found to be most effective is octenyl succinate starch. When mixed with synthetic polymers, not only will this starch enhance degradability of the material, but it can retain high tensile strength necessary when using the plastic in certain materials. Overall, the plastic material which results is superior in tensile strength, surface structure, texture and moisture absorption, is more uniform with consistant results while being degradable.

The resulting plastic can be degraded by a combination of chemical and biological reactions occurring in nature. The plastic materials can be used in manufacturing various disposable products such as expanded products (foamed cups, fast food containers, egg cartons, meat trays, etc.), film products (garbage and shopping bags, mulch films) and injection molded products.

Therefore, it is a primary object of this invention to provide for a plastic, and method of preparing the same, which is degradable.

Another object of the invention is to provide for a plastic, and method of preparing the same, which has satisfactory tensile strength, surface structure, texture and moisture absorption.

An object of the invention is to provide for a plastic and method of preparing the same which is uniform and provides consistant physical properties.

A still further object of the invention is to provide for a plastic, and method of preparing the same, which is prepared from granular starch.

Yet another object of the invention is to provide for a plastic, and method of preparing the same, from octenyl succinate starch.

Still further objects of the invention will become apparent in the following disclosure.

SUMMARY OF THE INVENTION

An improved plastic and a method of preparing the same are disclosed which incorporate octenyl succinate starch with a plastic which has hydrophobic tendencies. The starch is mixed at 6% to 50% by weight of the total composition for 10 to 50 minutes at a temperature of 145° C. up to 205° C. Various metal ion complexes of the octenyl succinate starch may be employed.

DETAILED DESCRIPTION OF THE INVENTION

The invention uses octenyl succinate starch combined with a plastic having hydrophobic properties in order to create a plastic which is biodegradable while also retaining good tensile strength, surface structure, texture and moisture absorption.

The starch to be used is granular starch, and preferably the starch is small grain for film products, since smaller grain particles retain better continuity of the plastic polymers in a film. This allows for thinner films of plastic to be produced while retaining good tensile strength. An example of one method of producing small granular starch is disclosed in my related and commonly assigned application, "Small Granular Starch and Method of Preparing Same", Ser. No. 382,491 filed July 21, 1989 abandoned. Native starch may also be employed. An example of an inexpensive starch used in these processes is corn starch.

Attached to the starch is octenyl succinate metal complex. It includes an eight chain hydrocarbon with double bonds, which is attached to succinic acid. The octenyl succinate is attached to the starch with an ester linkage, e.g., a carboxyl group on the succinate and hydroxy group on the starch are linked. Any multivalent metal ion complexes can be employed. Metal ions in the complexes include aluminum, manganese, copper, iron, cobalt and other transition metals. Octenyl succinate starch aluminum complex is commercially available and can be obtained under the trade name "Dry-Flo" from National Starch Products, Inc. in New York, N.Y., and through its Bridgewater, N.J. office. This starch is the subject of a patent assigned to National Starch by Caldwell, U.S. Pat. No. 2,613,206, incorporated herein by reference. Example 7 within this patent shows one method of producing octenyl succinate acid anhydride.

The plastic to be combined with the starch is any type of plastic which has hydrophobic properties. Examples of those typically used in the industry include polyethylene, polypropylene, polystyrene, and polyvinylchloride. The preferred polymers here are polyethylene and polystyrene.

The starch octenyl succinate metal ion complex is combined with the plastics so that the starch derivative comprises from 6% to 50% of the resulting composition. As the amount of starch is increased, degradability characteristics will increase, but tensile strength has a tendency to decrease. It has been found that the preferred range of incorporation is from 7% by weight to 15% by weight.

The mixing time for the components also has an effect upon the resulting properties. The longer that the starch and plastic are mixed, the more improved will be the tensile strength. Mixing time may last from 10 minutes up to 50 minutes, with 30 minutes being most preferred.

The tensile strength will also increase as the mixing rate is increased. The range of mixing rate is 20 rpm up to 60 rpm, and with 40 rpm most preferred. The resulting plastic is uniform and as the following data confirm, the plastic has consistant physical properties.

The temperature at which the components are maintained during this procedure ranges from 145° C. up to 205° C. It has been found that the most preferred temperature is 185° C. for providing good tensile strength, color and surface structure.

The result is a plastic which is capable of complete degradability through reactions in nature. Transition metal ion complexes of the starch octenyl succinate are unique because they carry the precursors for both chemical and biological degradation in one physical entity. The octenyl molecule contains a double bond which can be oxidized to generate free radicals that initiate the chemical degradation of synthetic polymer molecules. The oxidation reaction of octenyl molecules can be catalyzed and enhanced by transition metal ions such as iron, copper, manganese, and cobalt incorporated in the starch granules.

Table 1 below shows the effect of mixing temperature on tensile strength of low density polyethylene incorporated in the resulting mixture at 80% by weight, with corn starch octenyl succinate aluminum complex at 20%, as extruded rods. The mixing time employed was 30 minutes, and the rate was 40 rpm.

TABLE 1

Effect of mixing temperature on tensile strength of LDPE - 20% cornstarch octenyl succinate aluminum complex extruded rods, mixing time, 30 minute mixing rate, 40 rpm.

| Temp. (°C.) | Tensile strength (psi) | |
| --- | --- | --- |
| | Mean | SD |
| 145 | 1454 | 55 |
| 165 | 1463 | 25 |
| 185 | 1531 | 26 |
| 205 | 1462 | 39 |

The effect of mixing time and mixing rate on tensile strength of low density polyethylene and corn starch octenyl succinate in the amounts described in Table 1 is shown below in Table 2. The temperature at which the reaction occurred was 185° C.

TABLE 2

Effect of Mixing Time and Mixing Rate on Tensile Strength of LDPE - 20% Cornstarch Octenyl Succinate Aluminum Complex Extruded Rods Temp., 185° C.

| Time (Min) | RPM | N Sample Number | Tensile Strength (psi) | |
| --- | --- | --- | --- | --- |
| | | | Mean | SD |
| 10 | 20 | 15 | 1366 | 29 |
| 10 | 40 | 15 | 1398 | 32 |
| 10 | 60 | 15 | 1462 | 29 |
| 30 | 20 | 15 | 1482 | 60 |
| 30 | 40 | 15 | 1485 | 32 |
| 30 | 60 | 15 | 1504 | 50 |
| 50 | 20 | 15 | 1491 | 19 |
| 50 | 40 | 15 | 1504 | 48 |
| 50 | 60 | 15 | 1519 | 55 |

The foregoing are presented as a manner of illustrating the invention and it is apparent to those skilled in the art that variations may occur and fall within the scope of the invention.

Thus, it can be seen that the invention accomplishes at least all of its objectives.

We claim:

1. A degradable, high tensile strength plastic comprising from about 6% by weight to about 50% by weight of an octenyl succinate starch metal ion complexes and the balance comprising a plastic having hydrophobic tendencies selected from the group consisting of polyethylene, polypropylene, polystyrene and polyvinyl chloride.

2. The degradable plastic of claim 1 wherein said starch is corn starch.

3. The degradable plastic of claim 1 wherein said plastic is selected from the group consisting of polyethylene and polystyrene.

4. The degradable plastic of claim 1 wherein metal ions in said complexes are selected from the group consisting of aluminum and transition metals.

5. The degradable plastic of claim 1 wherein said octenyl succinate starch comprises 7% by weight to 15% by weight of said total composition.

6. The degradable plastic of claim 1 wherein said degradable plastic is formed by mixing said octenyl succinate starch and said hydrophobic plastic for 10 minutes up to 50 minutes.

7. The degradable plastic of claim 1 wherein said degradable plastic is formed by mixing said octenyl succinate starch and said hydrophobic plastic at a rate of 20 rpm up to 60 rpm.

8. The biodegradable plastic of claim 1 wherein said biodegradable plastic is formed by mixing said octenyl succinate starch aluminum complex and said hydrophobic plastic at a temperature of 145° C. up to 205° C.

9. A degradable, high tensile strength plastic comprising:
    octenyl succinate starch metal ion complex comprising from 6% to about 50 T of said degradable plastic;
    said octenyl succinate starch derived from corn starch of about 5 microns in size or less; and
    a plastic selected from the group consisting of polyethylene and polystyrene.

10. A method of producing degradable, high tensile strength plastic comprising:
    mixing octenyl succinate starch metal ion complex with a plastic having hydrophobic properties;
    said mixing occurring for a time and at a rate which increase the tensile strength of the plastic.

11. The method of claim 10 further comprising deriving said octenyl succinate starch from small grain starch about 5 microns in size or less.

12. The method of claim 10 wherein said plastic is selected from the group consisting of polyethylene and polystyrene.

13. The method of claim 10 wherein said octenyl succinate starch and said plastic is mixed so that said starch comprises 6% by weight to 50% by weight of said degradable plastic.

14. The method of claim 13 wherein said octenyl succinate starch and said plastic is mixed so that said starch comprises 7% by weight up to 15% by weight of said degradable plastic.

15. The method of claim 10 wherein said octenyl succinate starch and said plastic are mixed for 10 minutes to 50 minutes.

16. The method of claim 10 wherein said octenyl succinate starch and said plastic are mixed for 30 minutes.

17. The method of claim 10 wherein said octenyl succinate starch and said plastic are mixed at a rate of 20 rpm up to 60 rpm.

18. The method of claim 10 wherein said octenyl succinate starch and said plastic are mixed at a rate of 40 rpm.

19. The method of claim 10 wherein said octenyl succinate starch and said plastic are mixed at a temperature of 145° C. up to 205° C.

20. The method of claim 10 wherein said octenyl succinate starch and said plastic are mixed at a temperature of 185° C.

* * * * *